United States Patent [19]
Buckhaven

[11] Patent Number: 6,132,303
[45] Date of Patent: Oct. 17, 2000

[54] HUMANE CRUSTACEAN PROCESSOR

[76] Inventor: Simon Buckhaven, Greystones, 53 Church Road, Studham, Bedfordshire LU6 2QD, United Kingdom

[21] Appl. No.: 09/403,823

[22] PCT Filed: Apr. 27, 1998

[86] PCT No.: PCT/GB98/01219

§ 371 Date: Dec. 30, 1999

§ 102(e) Date: Dec. 30, 1999

[87] PCT Pub. No.: WO98/48635

PCT Pub. Date: Nov. 5, 1998

[30] Foreign Application Priority Data

Apr. 27, 1997 [GB] United Kingdom ............... 9708444

[51] Int. Cl.[7] .................................................. A22C 29/04
[52] U.S. Cl. .................................. 452/59; 452/1
[58] Field of Search ................ 452/59, 58, 1, 452/12

[56] References Cited

U.S. PATENT DOCUMENTS

| | | | |
|---|---|---|---|
| 2,722,036 | 11/1955 | Servidio | 452/59 |
| 3,261,693 | 7/1966 | Jung . | |
| 3,918,123 | 11/1975 | Harben, Jr. | 452/59 |
| 4,153,971 | 5/1979 | Simonds | 452/59 |
| 4,563,830 | 1/1986 | Cain, Jr. et al. . | |
| 5,253,610 | 10/1993 | Sharber | 452/59 |
| 5,305,711 | 4/1994 | Sharber . | |
| 5,800,257 | 9/1998 | Craig | 452/59 |

FOREIGN PATENT DOCUMENTS

| | | |
|---|---|---|
| 23 21 646 | 11/1974 | Germany . |
| 23 26 164 | 12/1974 | Germany . |
| 295 02 841 U | 4/1995 | Germany . |
| 29502 841 U | 4/1995 | Germany . |
| 020 197097A | 1/1989 | Japan . |
| 9 000 002 | 8/1991 | Netherlands . |
| 1 004 916 | 9/1965 | United Kingdom . |
| 2 170 088 | 7/1986 | United Kingdom . |
| 2 275 169 | 8/1994 | United Kingdom . |
| WO 80/0397 A1 | 3/1980 | WIPO . |
| 83/02215 | 7/1983 | WIPO . |
| WO 83 02215 | 7/1983 | WIPO . |

Primary Examiner—Willis Little
Attorney, Agent, or Firm—Scully, Scott, Murphy & Presser

[57] ABSTRACT

An apparatus for applying an electric current to a crustacean comprising: (i) an electrically insulated tank adapted to contain the crustacean; (ii) two electrodes arranged such that the crustacean can be placed between the electrodes; and (iii) means for creating an electrical potential across the electrodes such that in use current flows between the electrodes and through the crustacean such that the crustacean is anaesthetised or killed.

16 Claims, 9 Drawing Sheets

Flexible electrode version

Flexible electrode version

Electrodes open

Electrodes closed

Contact electrodes are inter-digitated

Bus Bars 82

Finger electrode version

Bus bars rotate to make contact with crustacean

Verticle feed system

Horizontal feed system

FIG. 13
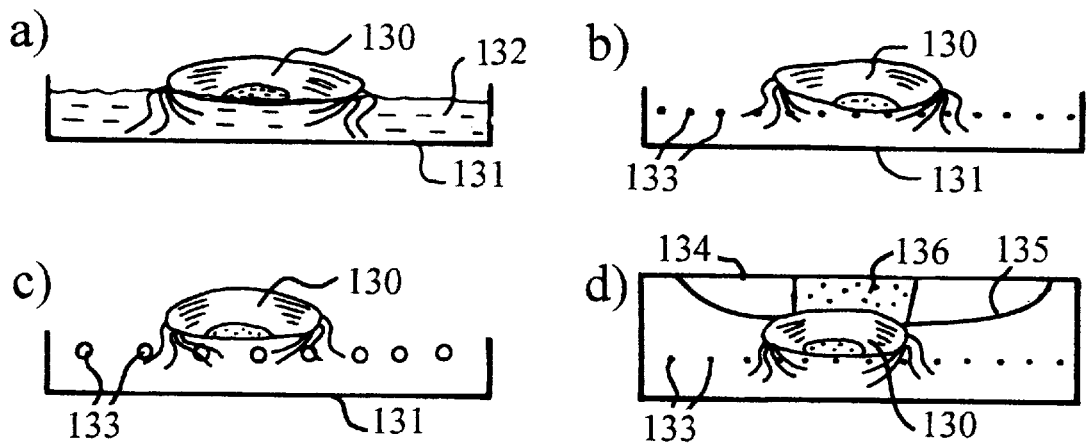
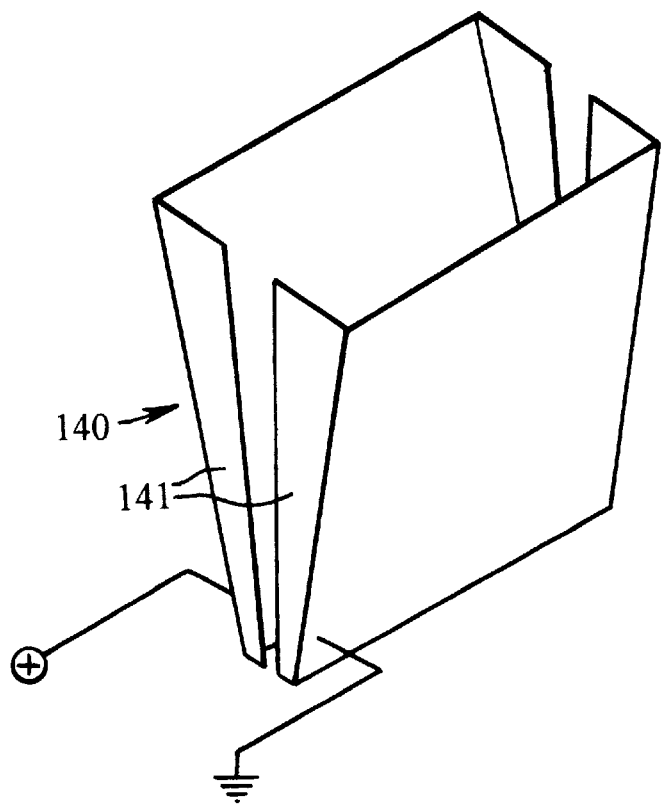
FIG. 14

HUMANE CRUSTACEAN PROCESSOR

FIELD OF INVENTION

The present invention relates to an apparatus and a method for applying an electric current to a crustacean such that the crustacean is stunned, anaesthetised or killed humanely prior to cooking. The invention extends to apparatus and methods for the bulk treatment of crustacea.

BACKGROUND OF THE INVENTION

The cooking of fresh shellfish or crustaceans has always presented some people with an ethical dilemma. The flesh of a crustacean decays very quickly after death which significantly affects the flavour of the meat. Lobsters and other crustaceans do spoil rapidly after death, which is why many buyers insist on receiving them alive.

If the lobster is "headed" before or soon after death, the body meat will keep fresh longer. This is because the head area contains the thorax which is the site of most of the viscera and gills which spoil much more rapidly than the claw or tail meat.

Freezing slows deterioration and harmful chemical reactions that follow death.

Neither of these solutions are totally effective as they either involve removing parts of the animal or the possibility of damaging the delicate flesh through freezing. The most desirable method of cooking crustaceans is when they are at their optimum freshness i.e. alive. However many people have an ethical objection to the concept of cooking a live animal.

It is accordingly an object of the present invention to provide an apparatus for applying an electric current to a crustacean which overcomes or at least mitigates one or more of the problems noted above.

SUMMARY OF THE INVENTION

According to the present invention there is provided an apparatus for applying an electric current to a crustacean comprising:

(i) an electrically insulated tank adapted to contain the crustacean;

(ii) two electrodes arranged such that the crustacean can be placed between the electrodes; and (iii) means for creating an electrical potential across the electrodes such that in use current flows between the electrodes and through the crustacean such that the crustacean is anaesthetised or killed. This provides the advantage that a crustacean such as a lobster can be quickly and simply killed or anaesthetised prior to cooking. The crustacean does not have to be cut or decapitated or cooked whilst still alive.

Preferably the tank is adapted to hold an electrically conductive fluid. For example a saline solution can be used. Using a fluid in this way gives the advantage that the crustacean itself does not need to come into contact with the electrodes and the risk of burning or other damage from the electrodes themselves is reduced.

Preferably the tank further comprises a heat source such that it is possible to retain the crustacean in the fluid filled tank for cooking, after the crustacean has been anaesthetised or killed.

According to one embodiment of the invention the electrodes are substantially rigid. These electrodes are simple to manufacture and install.

According to another embodiment of the invention the electrodes are deformable and are adapted to be placed against the crustacean such that in use the electrodes conform to fit the shape of the crustacean. This has the advantage that a good electrical contact between the electrodes and the crustacean can be readily achieved. The area of contact between the electrodes and the crustacean is increased by allowing the electrodes to conform to the shape of a crustacean which can be irregular and varied in shape.

In a further embodiment of the invention each electrode comprises a plurality of curved fingers. This has the advantage that a crustacean can be held in place between the electrodes and also a good electrical contact between the electrodes and the crustacean is achieved.

In another embodiment each electrode comprises a resilient mesh. In this way one or more crustacea can be held between the electrodes and a good electrical contact achieved.

In another embodiment each electrode comprises a plurality of resiliently biased probes arranged to protrude from the periphery of the tank towards the centre. A crustacean can be placed between the probes, which then conform to fit the shape of the crustacean and maintain a good electrical contact with it. By increasing the number of points of contact of the electrodes with the crustacean the delivery of an effective dose of electricity is more readily achieved.

According to another aspect of the present invention there is provided an apparatus for applying an electric current to a crustacean comprising:

(i) two electrodes arranged such that the crustacean can be placed between the electrodes, each electrode comprising a rotating belt and wherein the belts rotate in opposite directions; and (ii) means for creating an electrical potential across the electrodes such that in use current flows between the electrodes and through the crustacean such that the crustacean is anaesthetised or killed. This has the advantage that the motion of the belts can be used to draw a crustacean through the apparatus in order that several crustacea can be processed consecutively.

Preferably, said means for creating an electrical potential across the electrodes comprises means for creating a pulsed or alternating potential across the electrodes. This enables a pulsed or alternating current to be applied to the crustacean which has been found to be effective for killing or anaesthetising crustacea.

Preferably the tank further comprises a sealable lid and the apparatus further comprises a safety device adapted to prevent opening of the lid whilst electric current flows between the electrodes. This prevents the cook from electrocuting him or herself accidentally.

It is also preferred that the apparatus further comprises at least one detector, adapted to detect the presence of the crustacean between the electrodes. This enables the flow of electric current to be prevented except when a crustacean is present in the apparatus.

DESCRIPTION OF THE DRAWINGS

The invention will be further described, by way of example, with reference to the accompanying drawings in which:

FIGS. 13a to 13d illustrate a crustacean in a shallow bath.

FIG. 14 shows the electrodes of a stunning funnel.

DESCRIPTION OF PREFERRED EMBODIMENTS

Embodiments of the present invention are described below by way of example only. These examples represent the best ways of putting the invention into practice that are currently known to the Applicant although they are not the only ways in which this could be achieved.

Theory of Operation

This section will describe the method of humanely anaesthetising or killing of the crustacean used by the apparatus. The practical implementation of these methods will be discussed later in this document.

The basis of operation is that an animals' neurology can be disturbed by the application of external electric currents. The application of an electric current may render an animal unconscious or even kill it if the disturbance to the neurological structure is sufficiently great. The response that an externally applied current has on an animal depends on the level of current applied, the type of current and its duration.

Figure 5:
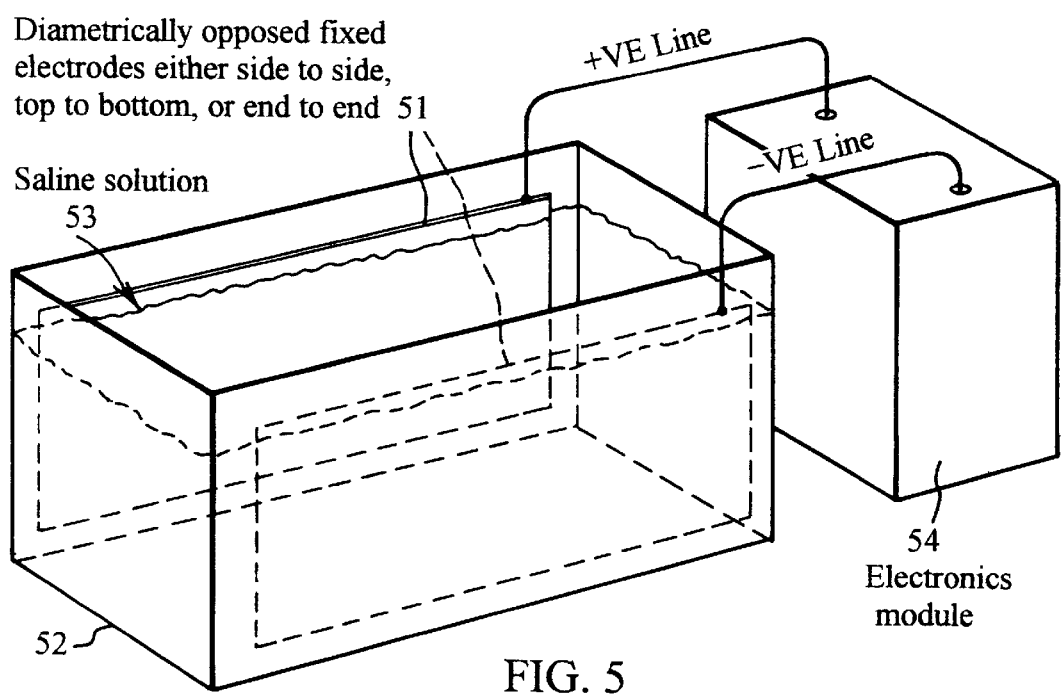
FIG. 5 is a perspective view of a fixed electrode version of the apparatus.
Figure 6:
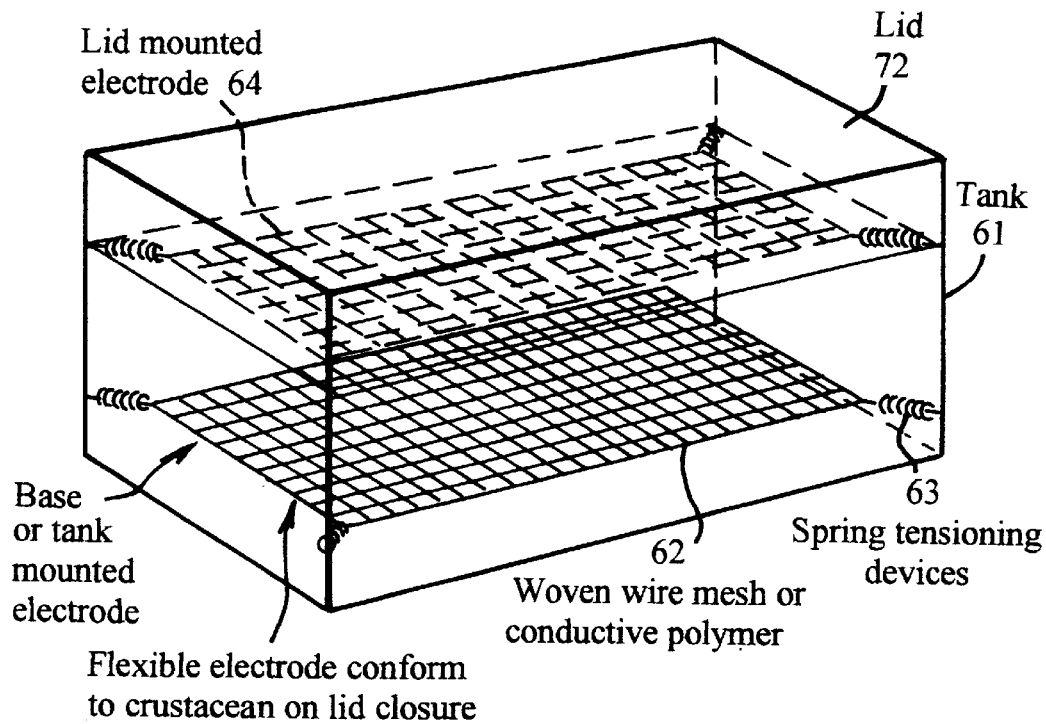
FIG. 6 is a perspective view of a wire mesh version of the apparatus.
Figure 7:
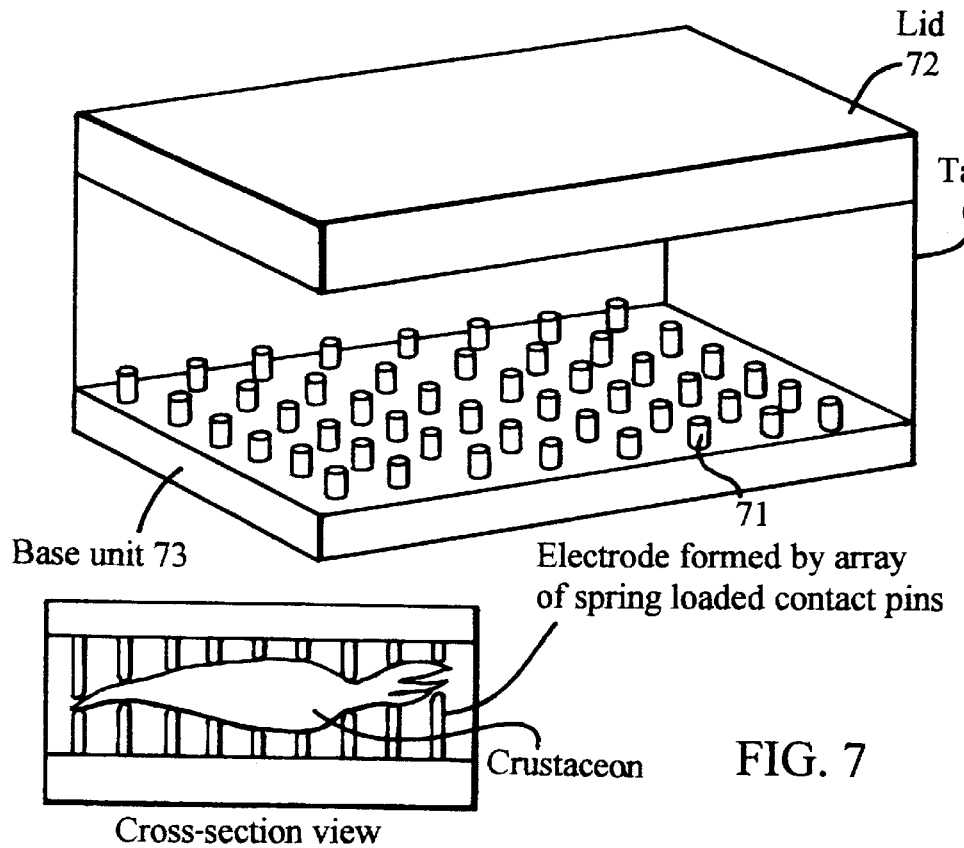
FIG. 7 is a perspective view of a spring contact electrode version of the apparatus.
Figure 10:
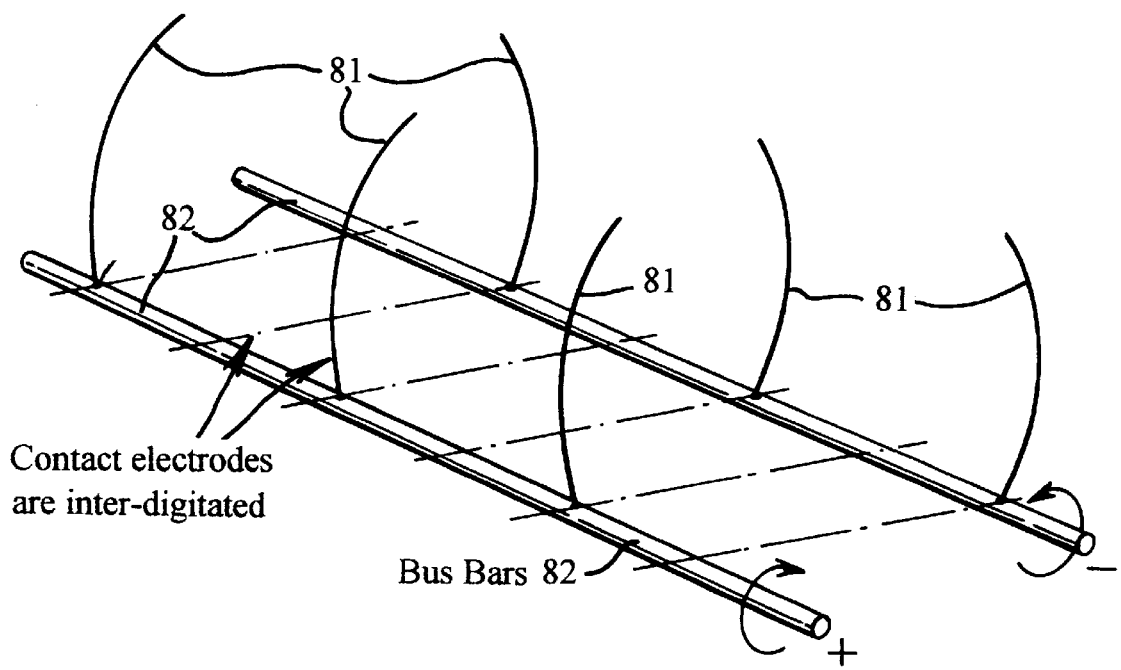
FIG. 10 is a perspective view of two finger electrodes.
Figure 11:
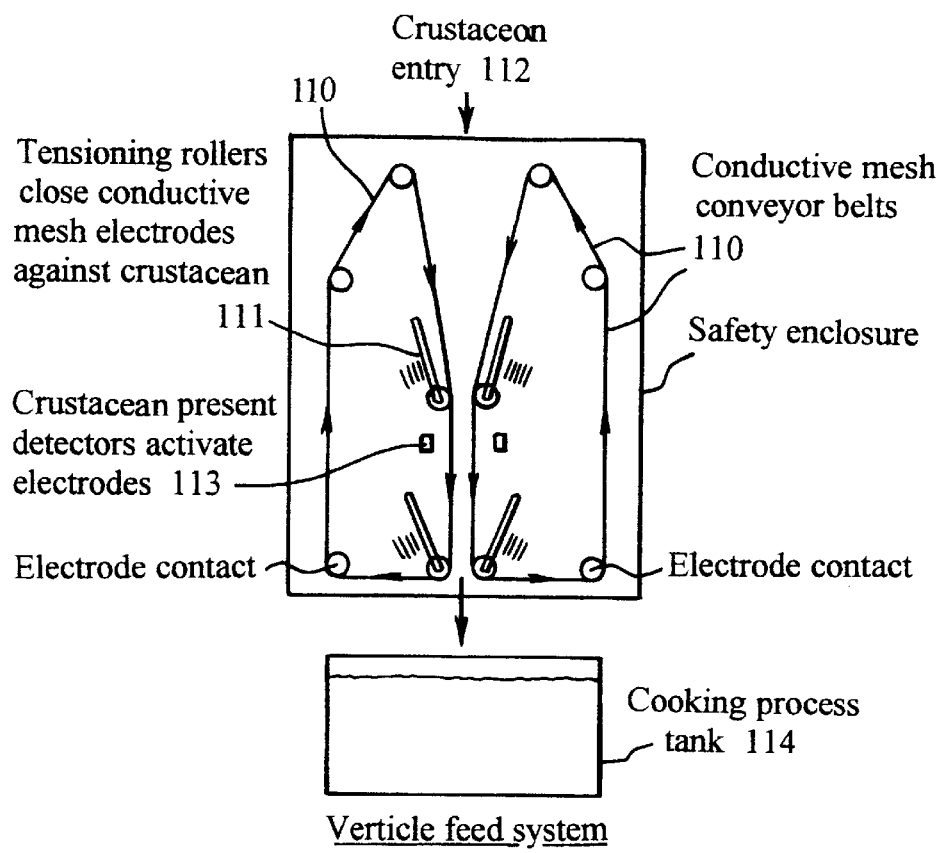
FIG. 11 is a side view of a vertical feed system version of the apparatus.
Figure 12:
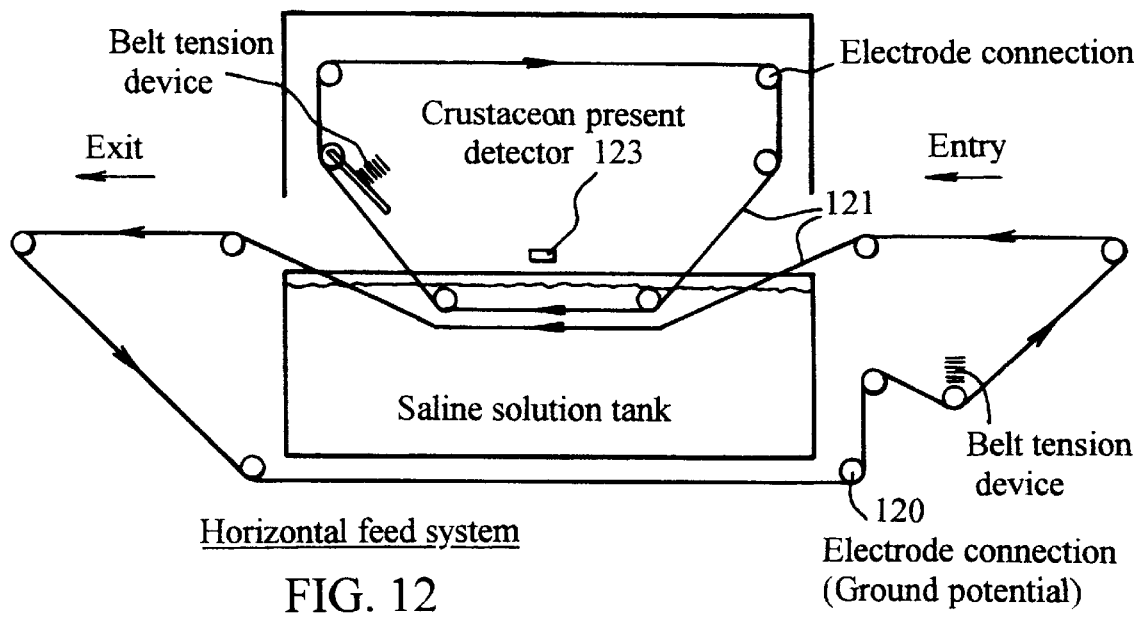
FIG. 12 is a side view of a horizontal feed system version of the apparatus.
Figure 15:
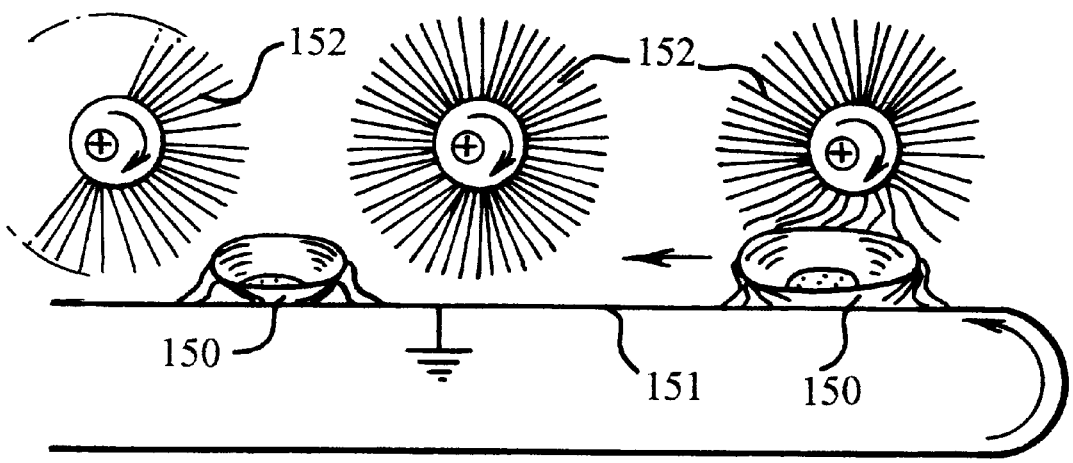
FIG. 15 shows crustaceans on a conveyer belt passing under rotating drums.
Figure 16:
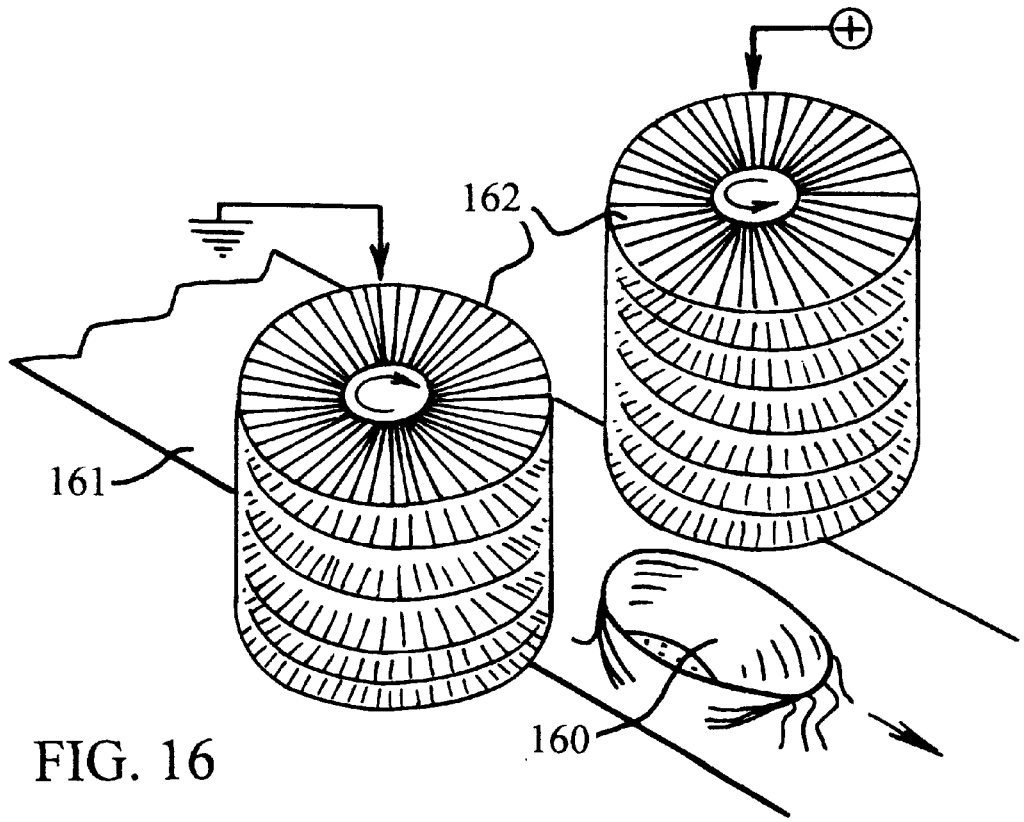
FIG. 16 shows a crustacean passing between two vertical brush or finger drums.
Figure 17:
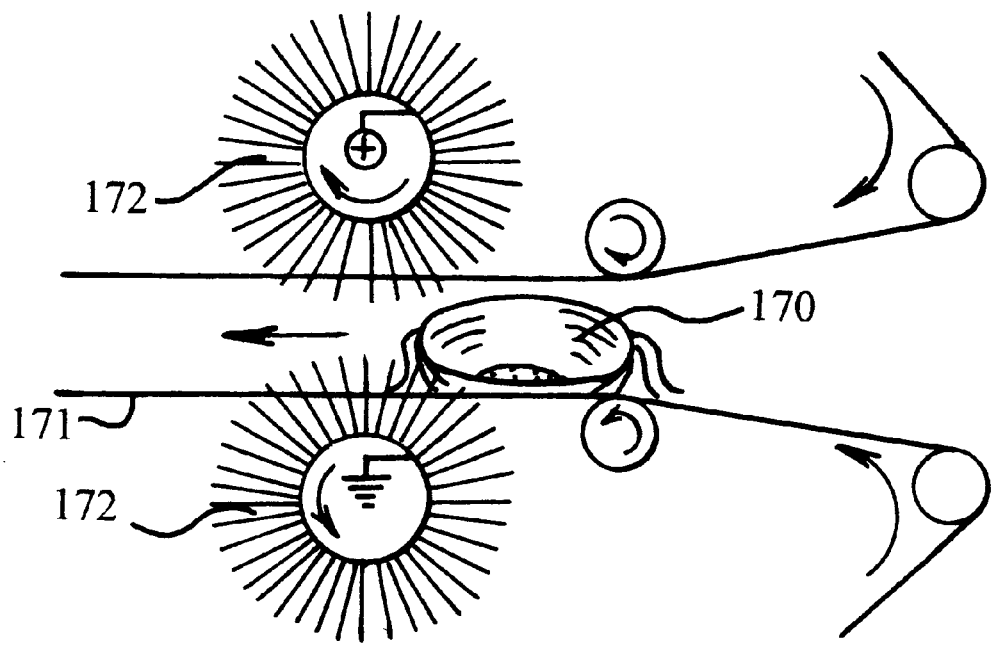
FIG. 17 shows a crustacean trapped between slotted belts and passing between rotating brush drums.
Figure 18:
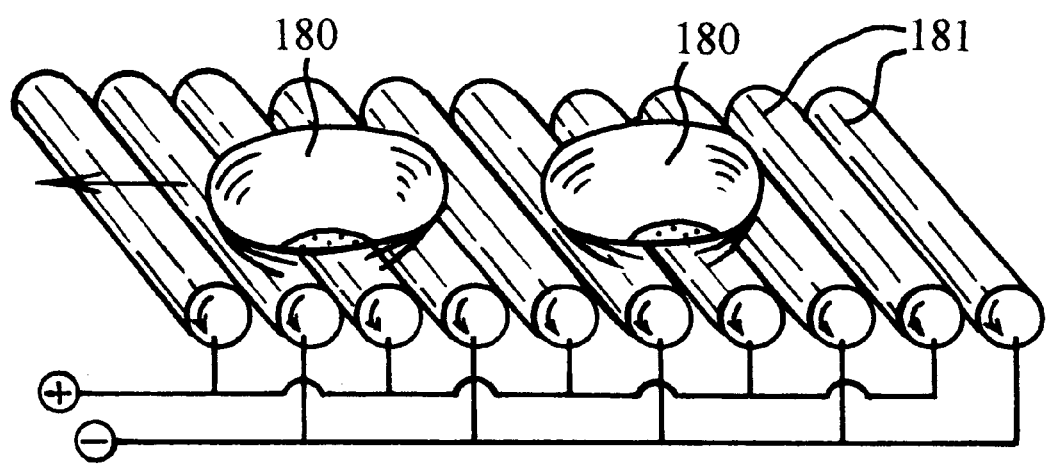
FIG. 18 shows two crustaceans on a series of rotating, electrified rollers.
Figure 19:
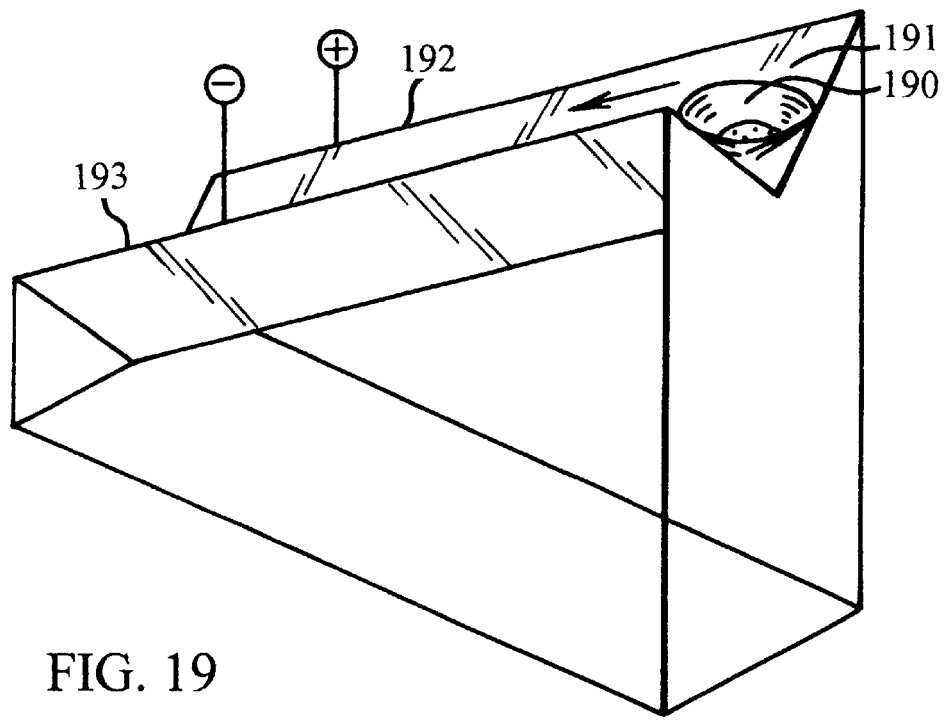
FIG. 19 shows a crustacean sliding down a chute, each wall of the chute being at a different electrical potential.
Figure 20:
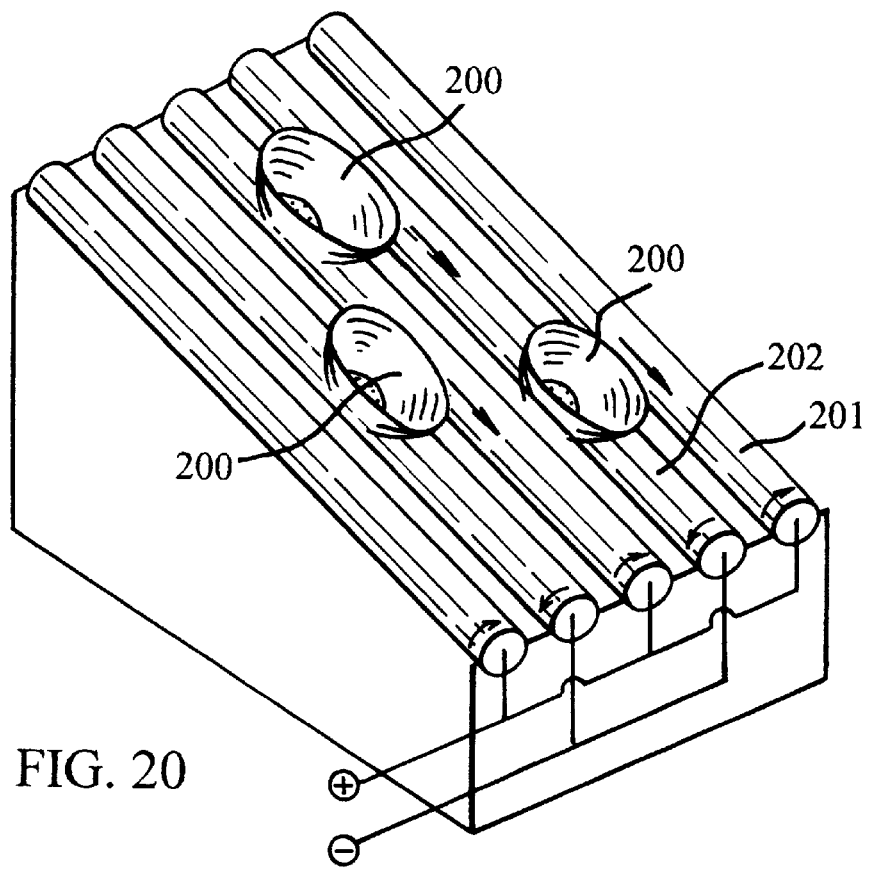
FIG. 20 shows an inclined bed of contra-rotating rollers at different electrical potentials.

The crustacean is placed in a dry or liquid-filled vessel containing two or more electrodes which may be in contact with the crustacean. A voltage potential is created across the electrodes using either direct, pulsed or alternating current. The term electrode is used to refer to any conductor by which a current enters or leaves the region around the crustacean. For example, an electrode could be a metal plate as shown in FIG. 5 or a wire mesh as shown in FIG. 6. An electrode can also be a plurality of spring loaded contact probes as shown in FIG. 7 or a bar with a plurality of curved fingers extending from it as shown in FIG. 10. Another possibility is for the electrode to be a conductive mesh conveyor belt as shown in FIGS. 11 and 12.

Figure 1:
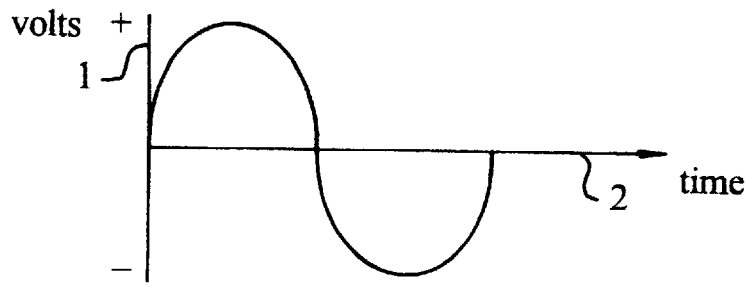
FIG. 1 shows an alternating voltage.

Direct current flows from the negative electrode (cathode) to the positive electrode (anode). In the case of alternating current the electrodes alternate between being cathode and anode continuously as the alternating voltage reverses its polarity and the direction of flow of the current. Alternating current is generally based on a sinusoidal signal producing a wave form similar to that shown in FIG. 1.

Figure 2:
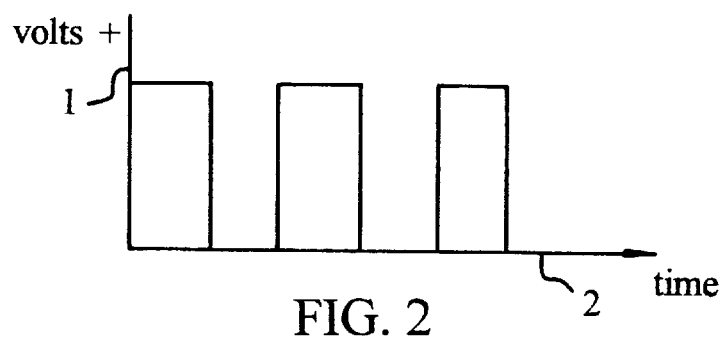
FIG. 2 shows a pulsed voltage.

Direct current produces a unidirectional current. However, this current can be switched on and off to produce a pulsed wave-form and shown in FIG. 2.

The frequency and duty cycle of direct current pulses or the frequency of the alternating current can have a variety of effects on animals varying from involuntary muscle contraction to paralysis, unconscious and death. The effect that frequency has varies from species to species, but the most effective frequency of operation tends to be in the region of 10 to 120 hertz.

The level of voltage and current required depends on the conductivity of the water or saline solution, if present. The reason for immersing the crustacean in a liquid is to reduce the possibility of localised burning at the electrode contact point and to allow the possibility of current flow into parts of the crustacean which are not in direct contact with the electrodes.

The conductivity of these fluids will normally lie in the range of 50 to 2,000 microsiemens. A fluid with a low conductivity will require a greater potential voltage to sustain the required current than a fluid with a high conductivity. This implies that the voltage source required may range from 100 to 1,000 volts depending on the conductivity of the fluid.

The magnitude of current necessary will depend on the size and nature of the crustacean and the conductivity of any liquid present. The person skilled in the art can determine the preferred current flow by experiment. It is anticipated that the mans for creating an electrical potential will include a means for varying the current.

Apparatus and Systems

In this section we will look at the methods of implementing the above concept. The design of apparatus can be split into single use and continuous use systems. A single use system is primarily for the consumer market and allows for one crustacean or a batch of crustaceans to be killed in a single cycle. The continuous use system is for large domestic, commercial or industrial applications where crustaceans can be placed on a conveyor or other continuous flow processing lines. Both of these systems will use similar electronics which will be explained later.

Single Use/Consumer Version

This version of the crustacean processor is designed for use in catering establishments or the home. The crustacean processor apparatus has the outward appearance of a box with a sealed lid on it. On one side of the box there is a control panel/display. The crustacean processor may also be filled with liquid of suitable salinity. The user opens the box, places the crustacean or crustaceans inside the box and shuts the lid. The user then selects the type/quantity of crustacean on the control panel which then starts the humane electrocution process. The user may also have the ability to cook the crustacean by use of an electrical heating element within the crustacean processor which can rapidly boil the water. Alternatively the user can remove the now anaesthetised/dead crustacean from the processor and cook in a conventional manner with the knowledge that any suffering of the animal has been kept to a minimum. Internally the crustacean processing apparatus may be one of four designs.

FIG. 5 shows the simplest design of apparatus which consists of fixed electrodes positioned at diametrically opposite sides or ends of the tank. This design necessitates that the crustaceans must be immersed in a fluid of suitable salinity for electrical current to flow. The electrodes in this version can be of any conventional design.

FIG. 6 shows a direct contact version where the bottom and top of the tank have a conductive woven wire mesh supported by springs or a large soft elastomer. The crustacean is placed on the lower surface and as the lid is closed the upper and lower mesh elastomeric surfaces will conform to the contours of the crustacean providing a reliable electrical contact. This method does not rely on fluid for electrical conductivity although fluid could still be used to improve contact resistance. This embodiment is intended to encompass any form of resiliently deformable or resiliently mounted electrode. The object is to increase the electrode/crustacean contact.

Another method of implementing the flexible electrode method is shown in FIG. 7. In this design the elastomer mesh support is replaced by a matrix of spring loaded contact probes which again would conform to the shape of the crustacean on closing the lid.

Figure 8:
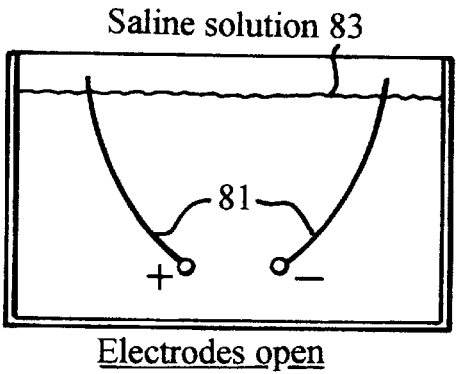
FIG. 8 is a side view of two finger electrodes in an open configuration.
Figure 9:
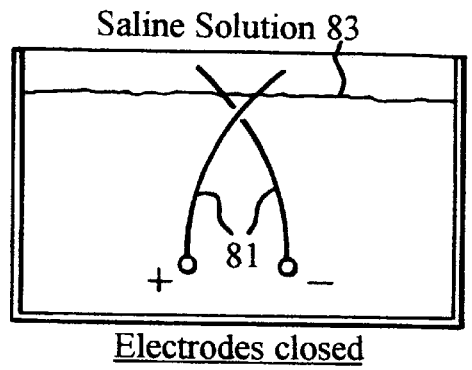
FIG. 9 is a side view of two finger electrodes in a closed configuration.

The fourth version is shown in FIGS. 8, 9 and 10. It consists of two sets of curved electrodes mounted in inter-digitated format on two independent shafts which also form electrical bus bars. The two shafts can rotate and the electrodes are mounted offset on the two opposing shafts producing an affect similar to interlocking fingers of two human hands. When the lid of the processor is opened the two sets of "fingers" move apart to allow the crustacean to be placed between them. On closing the lid the two sets of fingers move back together to hold the crustacean and provide good electrical contact. This method may be used with or without fluid.

All four designs have common attributes such as safety interlocks on the lid to make it physically impossible for the lid to open whilst there is electric current flowing between the electrodes. The designs would also share the same electronics and would all be "double insulated" i.e. there would be no external metal parts connected to earth.

Continuous Use/Commercial Application

This version of the processor is for use in large domestic, commercial or industrial operations where a large number of crustaceans need to be processed quickly and humanely. Two versions are described:—a hopper style version shown in FIG. 11 and a conveyor style processor shown in FIG. 12.

The hopper processor shown in FIG. 11 consists of two vertically running belts. The belts comprise conductive woven wire mesh or are of non-conducting material coated with a conductive layer or have a conductive wire mesh sewn into them. Each belt is connected to one of the electrodes via a slip ring. The belts are gently sprung loaded so that they approach close together but do not actually contact each other. The belts are driven by an electric motor so that they are continuously moving down and towards themselves in the middle section. The method of operation is that the crustaceans are fed into the hopper at the top of the processors. As the crustaceans reach the middle part of the processor the spring mounted belts move apart and adjust themselves to the width of the crustacean. After the crustacean contacts both belts it is exposed to the electric current which anaesthetises/kills it. The presence of a crustacean at the anaesthetising position is sensed by a detector which signals the electronics to activate the electrodes. The crustacean then drops out of the bottom of the processor for further processing such as cooking in boiling water.

The horizontal processor shown in FIG. 12 works on the same principle as the hopper processors except that it is part of a conveyor belt system which approach but do not touch each other. The important point to notice is that the conveyor part of the processing unit is either electrically isolated from the rest of the conveyor system for safety reasons, or has the exposed conveyor electrode at ground potential. The crustacean is contained between the two belts and then lowered in to a saline solution. When the presence of a crustacean is sensed at the central point the electrodes are activated.

Once again both methods use the same electrical discharge techniques described in this document to anaesthetise and or kill the crustacean.

Generic Electronics

Figure 3:
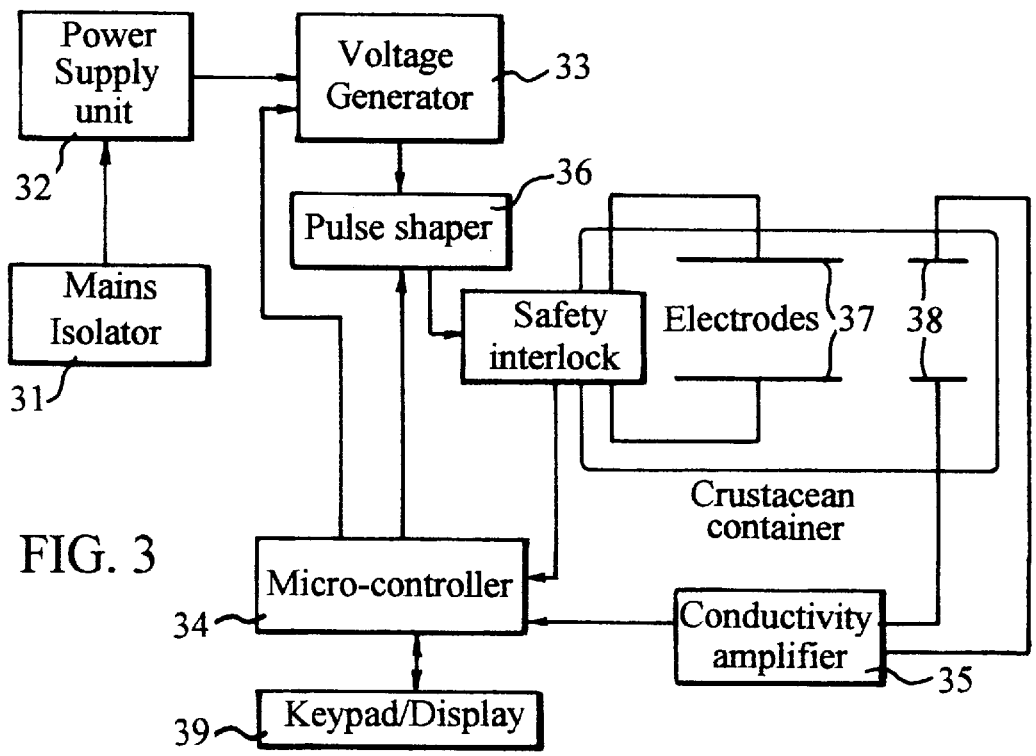
FIG. 3 is a schematic diagram of the electronic components of the apparatus.
Figure 4:
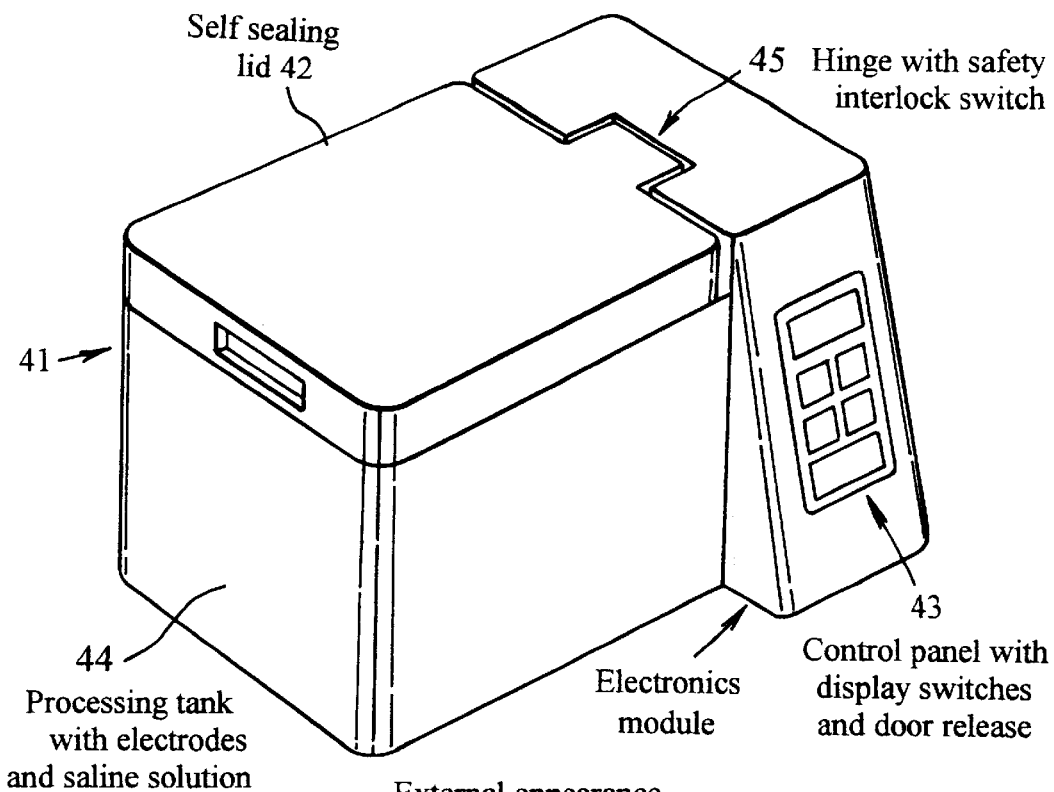
FIG. 4 is a perspective view of the apparatus.

The key parts of the electronics are shown in FIG. 3. The purpose of the electronics is to provide a controlled current to the electrodes which are in contact with the crustacean. As already discussed the frequency, duty cycle and duration of the current pulse need to be controlled. The purpose of each principle part of the electrical circuit will no be defined. FIG. 3 shows the electronics in the context of the single use system but any differences between the electronics between the single use and continuous use system is described where necessary.

Mains Isolator

The use of mains electricity in the proposed environment can be potentially hazardous. The proposed design must have a mains isolation transformer between the mains electricity supply and the device. This is essential in a consumer produce but may not be necessary in a commercial environment. EC wide EMC and LVD requirements are met by suitable protection components.

Power Supply Unit

The apparatus requires a stabilised low voltage DC supply for the voltage generator and to power auxiliary components such as the microcontroller and amplifier circuits. The voltage levels required for a commercial system may vary from those required for a consumer system.

Voltage Generator

This module produces the high voltages required to effectively kill a crustacean. The voltage generated will need to be in the range of 100 to 1,000 volts depending on the crustacean and the existing conductivity within the vessel. The discharge power level and duration are controlled by the microcontroller. The high voltages that are required may be generated by a step-up transformer circuit or by capacitive discharge. A capacitive discharge power supply would not be suitable for a continuous use system unless the through-put was adjusted to match the capacitor re-charge time, but would be ideal for a single use consumer system. This module also contains circuitry for limiting the maximum voltage discharge and controlling the duration of the discharge.

Pulse Shaper

This is one of the most important modules of the electronics system. As previously described the type of current wave form applied to the crustacean is very important. The pulse shaper contains circuitry that can produce alternating, pulsed or direct current output from the voltage generator. It will also be able to produce different frequencies and alter the duty cycle of the output wave form. These variables can be adjusted via the micro-controller to predetermined values or by manual adjustment.

Micro-Controller

The micro-controller controls the overall operation of the apparatus. The micro-controller is responsible for determining the correct voltage level, current type, frequency, duty cycle and duration which has to be applied to the crustacean. The values that it selects for these attributes are dependant on the type of crustacean and the existing electrical conductivity across the electrodes. The controller is also responsible for informing the user of what is happening and enabling the user to select the type and quantity of crustacean. In the continuous use system it also has to monitor and control the throughput rate. In both single use consumer product or industrial applications the micro-controller also has to monitor various safety aspects.

Safety Interlock

This is an essential part of the single use consumer product, where the electrodes might be accessible to the user during loading/unloading of crustaceans. The safety interlock provides the dual purpose of making it electrically impossible for any current to flow to the electrodes when the user could touch them. It is also used to inform the micro-controller whether the lid of the device is open or closed. Continuous use systems will have a safety interlock on their protective guards so that current can no flow to electrodes when the guards are removed for maintenance.

Electrodes/Conductivity Detectors

The electrode is the part of the circuit which delivers the electrical charge and detects the conductivity. The electrodes and the detectors may be separate devices or may be integrated into the same device for the single use system, but would have to be separate contacts in the continuous use system.

Conductivity Amplifier

This module simply monitors the conductivity across the conductivity detectors and converts this into a suitable analogue voltage for use by the microcontroller. It ensures that there is sufficient high conductivity to ensure full electrical discharge to humanely kill or anaesthetise the crustacean and avoids malfunction of the apparatus.

Keypad/Display

The user will need to be able to input parameters into the device such as type and quantity of crustacean, cooking time, etc. It can also be used to give visual feedback to the user as to the current status of the device. Indicators will signal the status of the safety circuits. The control panel may include the door release and its safety interlock.

What is claimed is:

1. An apparatus for applying an electric current to a crustacean comprising:

(i) an electrically insulated tank adapted to contain the crustacean;

(ii) a plurality of electrodes arranged such that the crustacean can be placed between the electrodes;

(iii) means for creating an electrical potential across the electrodes such that in use current flows between the electrodes and through the crustacean such that the crustacean is anaesthetised or killed, characterised in that, at least one of the electrodes is deformable and adapted to be placed against the crustacean such that in use said electrode conforms to fit the shape of the crustacean.

2. An apparatus as claimed in claim 1 wherein said at least one deformable electrode is arranged to extend along substantially the length of the tank.

3. An apparatus as claimed in claim 1 wherein said at least one deformable electrode comprises a resilient mesh.

4. An apparatus as claimed in claim 1 wherein the tank is adapted to hold an electrically conductive fluid.

5. An apparatus as claimed in claim 1 wherein the tank further comprises a heat source such that it is possible to retain the crustacean in the fluid filled tank for cooking, after the crustacean has been anaesthetised or killed.

6. An apparatus as claimed in claim 1 wherein each electrode comprises a plurality of curved fingers.

7. An apparatus as claimed in claim 1 wherein each electrode comprises a plurality of resiliently biased probes arranged to protrude from the periphery of the tank towards the centre.

8. An apparatus as claimed in claim 1 wherein the tank further comprises a sealable lid and the apparatus further comprises a safety device adapted to prevent opening of the lid whilst electric current flows between the electrodes.

9. An apparatus for applying an electric current to a crustacean comprising:

(i) two electrodes arranged such that the crustacean can be placed between the electrodes, each electrode comprising a rotating belt and wherein the belts rotate in opposite directions; and (ii) means for creating an electrical potential across the electrodes such that in use current flows between the electrodes and through the crustacean such that the crustacean is anaesthetised or killed.

10. An apparatus as claimed in claim 9 wherein said means for creating an electrical potential across the electrodes comprises means for creating a pulsed or alternating potential across the electrodes.

11. An apparatus as claimed in claim 9 further comprising at least one detector, adapted to detect the presence of the crustacean between the electrodes.

12. A method of applying an electric current to a crustacean comprising the steps of:

(i) placing the crustacean into an electrically insulated tank and between at least two electrodes; and (ii) creating an electrical potential across the electrodes such that in use current flows between the electrodes and through the crustacean such that the crustacean is anaesthetised or killed; characterised in that at least one of the electrodes is deformable and adapted to be placed against the crustacean such that in use said electrode conforms to fit the shape of the crustacean.

13. A method as claimed in claim 12 wherein said at least one deformable electrode comprises a resilient mesh.

14. A method as claimed in claim 12 wherein said at least one deformable electrode is arranged to extend along substantially a full body length of a crustacean in use.

15. An apparatus as claimed in claim 1, wherein said means for creating an electrical potential across the electrodes comprises means for creating a pulsed or alternating potential across the electrodes.

16. An apparatus as claimed in claim 1 further comprising at least one detector, adapted to detect the presence of the crustacean between the electrodes.

* * * * *